(12) United States Patent
Patel et al.

(10) Patent No.: US 7,499,620 B2
(45) Date of Patent: Mar. 3, 2009

(54) LOW LOSS SOI/CMOS COMPATIBLE SILICON WAVEGUIDE

(75) Inventors: Vipulkumar Kantilal Patel, Monmouth Junction, NJ (US); Prakash Gothoskar, Allentown, PA (US); Robert Keith Montgomery, Easton, PA (US); Margaret Ghiron, Allentown, PA (US)

(73) Assignee: Lightwire, Inc., Allentown, PA (US)

( * ) Notice: Subject to any disclaimer, the term of this patent is extended or adjusted under 35 U.S.C. 154(b) by 176 days.

(21) Appl. No.: 11/516,217

(22) Filed: Sep. 6, 2006

(65) Prior Publication Data

US 2007/0000862 A1    Jan. 4, 2007

Related U.S. Application Data

(62) Division of application No. 10/806,738, filed on Mar. 23, 2004, now Pat. No. 7,118,682.

(60) Provisional application No. 60/458,501, filed on Mar. 28, 2003, provisional application No. 60/464,491, filed on Apr. 21, 2003.

(51) Int. Cl.
*G02B 6/10* (2006.01)

(52) U.S. Cl. ........................................... 385/130

(58) Field of Classification Search .......... 385/129–132
See application file for complete search history.

(56) References Cited

U.S. PATENT DOCUMENTS

| | | | |
|---|---|---|---|
| 5,143,577 A | 9/1992 | Haas et al. | |
| 5,637,264 A | 6/1997 | Knapp et al. | |
| 6,063,299 A | 5/2000 | Drake et al. | |
| 6,391,732 B1 | 5/2002 | Gupta et al. | |
| 6,684,007 B2 | 1/2004 | Yoshimura et al. | |
| 2003/0068151 A1* | 4/2003 | Gunn et al. | 385/129 |
| 2003/0123827 A1 | 7/2003 | Salerno et al. | |
| 2004/0020893 A1 | 2/2004 | Drake et al. | |
| 2005/0152658 A1* | 7/2005 | Keyser | 385/129 |

* cited by examiner

*Primary Examiner*—Charlie Peng
(74) *Attorney, Agent, or Firm*—Wendy W. Koba

(57) ABSTRACT

A method and structure for reducing optical signal loss in a silicon waveguide formed within a silicon-on-insulator (SOI) structure uses CMOS processing techniques to round the edges/corners of the silicon material along the extent of the waveguiding region. One exemplary set of processes utilizes an additional, sacrificial silicon layer that is subsequently etched to form silicon sidewall fillets along the optical waveguide, the fillets thus "rounding" the edges of the waveguide. Alternatively, the sacrificial silicon layer can be oxidized to consume a portion of the underlying silicon waveguide layer, also rounding the edges. Instead of using a sacrificial silicon layer, an oxidation-resistant layer may be patterned over a blanket silicon layer, the pattern defined to protect the optical waveguiding region. A thermal oxidation process is then used to convert the exposed portion of the silicon layer into silicon dioxide, forming a bird's beak structure at the edges of the silicon layer, thus defining the "rounded" edges of the silicon waveguiding structure.

5 Claims, 11 Drawing Sheets

LOW LOSS SOI/CMOS COMPATIBLE SILICON WAVEGUIDE

CROSS-REFERENCE TO RELATED APPLICATION

This application is a divisional of U.S. application Ser. No. 10/806,738, filed Mar. 23, 2004 now U.S. Pat. No. 7,118,682, which claims the benefit of U.S. Provisional Application No. 60/458,501, filed Mar. 28, 2003 and U.S. Provisional Application No., 60/464,491, filed Apr. 21, 2003.

TECHNICAL FIELD

The present invention relates to an SOI/CMOS compatible silicon waveguide and, more particularly to a method of forming a low loss silicon waveguide by rounding corner edges of the silicon waveguide to reduce optical signal loss.

BACKGROUND OF THE INVENTION

It has been found that the same CMOS-based fabrication processes that are used to form electronic devices can be used to form both passive and active silicon-based optical devices, where in many cases a passive optical waveguide can be formed within the same integrated structure as an optical/electrical circuit. As such, the devices that perform the pure optical functions, the pure electrical functions and the opto-electronic functions can be produced concurrently, on the same substrate, and using the same process steps.

Passive optical waveguide devices, electronic devices and active optical waveguide devices, as well as methods of fabricating these devices, using standard CMOS processing techniques on a single Silicon-On-Insulator (SOI) wafer have been disclosed in our co-pending application Ser. No. 10/146,321, filed May 15, 2002. For example, pure electronic devices such as field effect transistors (FETs) can be fabricated using deposition, photolithography, ion implantation, etching processes, and the like, on an SOI wafer. Moreover, the passive optical waveguide devices and the active optical devices can be simultaneously fabricated on the SOI wafer. Advantageously, the masks and positioning equipment that are used for defining active electronic devices can also be used to simultaneously define both the passive optical waveguide devices and the active optical devices on the same substrate.

FIG. 1 contains an isometric view of a device including an optical waveguide arrangement 1 including a silicon waveguiding structure 2 and a relatively thin dielectric layer 3 disposed over a surface portion of an SOI wafer 4. SOI wafer 4 is illustrated as comprising a silicon substrate 5, a buried dielectric layer 6 and a relatively thin silicon surface layer 7. Optical waveguide structure 1, as depicted, will support propagation of an optical signal along the lateral extent of silicon waveguiding structure 2, as shown, with the waveguide itself comprising surface silicon layer 7, relatively thin dielectric layer 3 and silicon waveguiding structure 2. Buried dielectric layer 6 functions as a cladding layer for the waveguide structure and provides optical mode confinement. It is presumed, but not shown, that another dielectric material surrounds the exposed portions of dielectric layer 3 and silicon waveguiding structure 2 to provide for optical mode confinement within the silicon structure, where both silicon surface layer 7 and silicon waveguiding structure 2 have a greater refractive index value than the dielectric forming the cladding region of the waveguiding arrangement.

While the structure of FIG. 1 is useful in supporting optical propagation along an SOI wafer, it has been found that the sharp, right-angled edges and corners in silicon waveguiding structure 2, such as lower edge 8 and upper edge 9 illustrated in FIG. 1, can be significant sources of optical loss along the waveguide, particularly when the waveguide dimensions fall below 1 µm. In particular, right-angled edges 8 and 9 create a high optical field intensity, leading to optical signal loss within the waveguiding structure. Additionally, the physical roughness of sidewalls 2-1 and 2-2 of silicon waveguiding structure 2 have been found to introduce scattering losses into the propagating optical signal. More particularly, an optical signal propagating along an optical waveguide will exhibit different phase velocities at various points within the body of the waveguide, where at any corner—such as lower edge 8 and upper edge 9—the phase velocity becomes equivalent to that of the surrounding cladding material. The signal becomes a planar wave at that location and, therefore, will no longer remain guided within the waveguide. As mentioned above, signal loss becomes more of a problem as the sizes of the various elements, such as silicon surface layer 7 and silicon waveguide 2 are reduced to sub-micron dimensions, since a larger overall portion of the signal will be lost to the presence of these high optical field intensities.

Further, as more complicated sub-micron opto-electronic device structures are introduced into the SOI platform, the presence of optical signal loss becomes more problematic. Current design developments are requiring greater operating data rates, such as 1 Gb/s and above, where these requirements impose more demands on the SOI platform, and the ability to reduce optical signal loss is a primary goal of most developers.

SUMMARY OF THE INVENTION

The need remaining in the art is addressed by the present invention, which relates to an SOI/CMOS compatible silicon waveguide and, more particularly to a method of forming a low loss silicon waveguide by rounding corner edges to reduce signal loss.

In accordance with the present invention, CMOS processing steps are utilized to round the right-angled edges of the silicon waveguiding structure used to support propagation of an optical signal within an SOI structure. By rounding the right angle corners/edges, the intensity of the optical fields existing along these edges are reduced, thus also reducing optical signal loss. In one embodiment, only the "top" edges of the silicon waveguide are rounded. In another embodiment, both the "top" edges and "bottom" edges of the silicon waveguide are rounded.

The present invention, in one set of embodiments, utilizes a sacrificial silicon layer to form the desired rounded corners in the underlying waveguide structure. In one exemplary process, sidewalls are formed along the silicon waveguide structure by etching the sacrificial silicon layer. Alternatively, the sacrificial silicon layer may be oxidized to consume a portion of the waveguide silicon along its edges, leaving a rounded structure.

In an alternative process embodiment, thermal oxidation is used to form the desired rounded silicon waveguide edges.

Various etchants, process sequences and other processing parameters may be modified in accordance with the method of the present invention to form the desired rounded structure, where the following drawings illustrate exemplary structures and fabrication steps to explain the inventive method.

BRIEF DESCRIPTION OF THE DRAWINGS

Referring now to the drawings, where like numerals represent like parts in several views.

DETAILED DESCRIPTION

Figure 1:
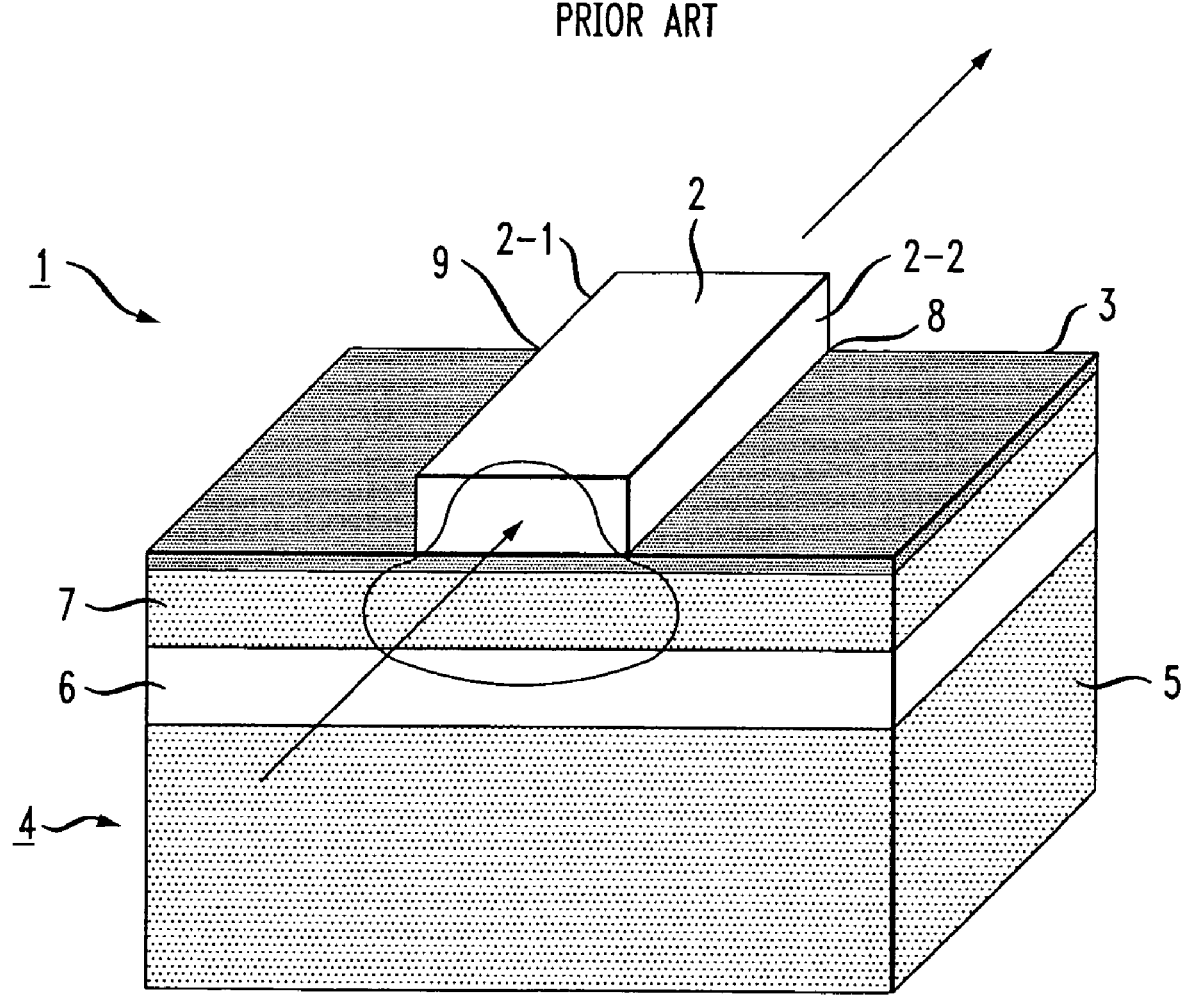
FIG. 1 illustrates an optical waveguiding structure, including right-angled edges, formed as part of an SOI structure.
Figure 2:
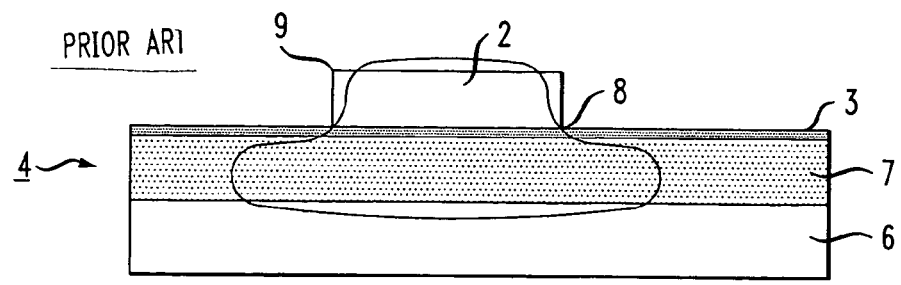
FIG. 2 is a partial cut-away side view of the structure of FIG. 1.

As described above in association with FIG. 1, the existence of the top and bottom right-angle corner edges in a silicon waveguide structure results in introducing optical signal loss into the arrangement. As system demands on silicon-based opto-electronics continue to increase, this loss will be unacceptable and a solution needs to be found. Moreover, it is not only the basic "rib" waveguide structure as shown in FIG. 1 that needs to be addressed. There exist many other silicon-based optical structures that utilize silicon waveguides having a multiplicity of edges/corners, as described below, where the existence of these corners/edges in the optical signal path is known to introduce loss. For the sake of comparison, FIG. 2 contains a partial cut-away side view of the arrangement of FIG. 1, where bottom edge 8 appears as a bottom corner location on the view of FIG. 2, and top edge 9 appears as a top corner location on the view of FIG. 2. It is to be understood that the view of FIG. 2 is considered a "partial" view inasmuch as silicon substrate 5 is not shown in this view (although it is presumed that each of the illustrated structures is built upon a silicon substrate). The arrangement as illustrated in FIG. 2, therefore, is considered as only one exemplary arrangement of a silicon waveguiding structure 2 as formed on an SOI structure 4.

It is an advantage of the waveguide rounding process of the present invention that the process is not limited by the geometry of the device structure. For example, there exist many different geometries/arrangements of a silicon waveguiding layer as used with respect to an SOI platform. See, for example, applicants' copending application Ser. No. 10/795,748, filed Mar. 8, 2004, for a variety of different device geometries that may be used. Indeed, for the sake of discussion, the following FIGS. 3-5 illustrate a set of different waveguide structures that may each benefit by utilizing the waveguide rounding technique of the present invention.

Figure 3:
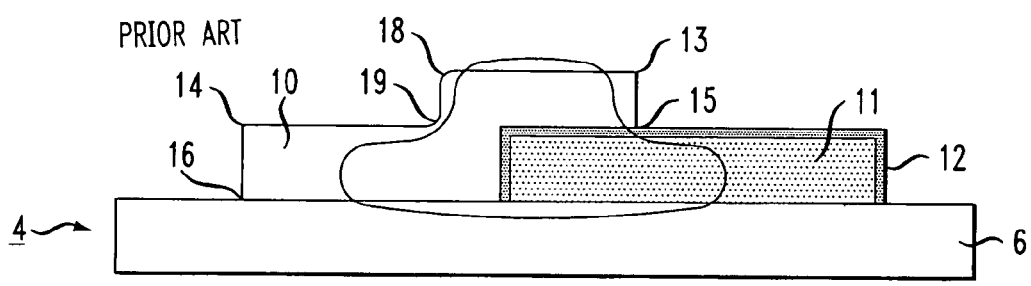
FIGS. 3-5 illustrate various geometries of optical waveguiding structures utilizing a silicon layer overlying an SOI structure, the silicon waveguiding layer in each embodiment exhibiting conventional "right-angle" corners.

In particular, FIG. 3 illustrates an embodiment of an SOI-based optical waveguiding structure utilizing a silicon waveguiding element 10 in association with a "rib" structured single crystal silicon region 11, where region 11 was formed by removing (etching) a portion of surface layer 7 of the SOI structure (see FIGS. 1 and 2). In the embodiment of FIG. 3, silicon rib 11 is covered on all exposed surfaces by a surrounding dielectric layer 12, where dielectric layer 12 may comprise a relatively thin layer having a thickness of 500 Å or less. As shown, silicon waveguiding element 10 is disposed to also cover a portion of silicon rib 11. The optical mode within the waveguiding structure formed by the combination of element 10, dielectric layer 12 and silicon rib 11 is shown in FIG. 3. In the embodiment as shown in FIG. 3, silicon element 10 includes a number of edges/corners, where top edge 13 and bottom edge 15 may contribute to optical loss within the waveguiding structure. It is to be noted that edges 14 and 16, being removed from the optical waveguiding portion, do not introduce optical loss but may still be processed to exhibit rounded edges as an inherent result of conventional CMOS processing techniques. Further, as a characteristic of well-known silicon deposition processes, edges 18 and 19 may be "rounded" as deposited where, for example, Low Pressure Chemical Vapor Deposition (LPCVD) of silicon (e.g., poly-silicon or amorphous silicon) is known to conformally coat underlying features. In most of the preferred embodiments of the present invention, both silicon rib 11 and silicon waveguiding element 10 will be less than 1 μm in thickness and, therefore, the presence of optical signal loss from edges will be more problematic.

Figure 4:
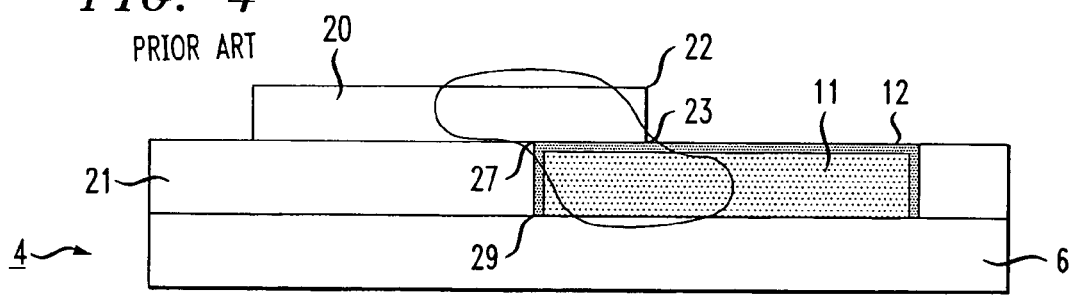
Figure 5:
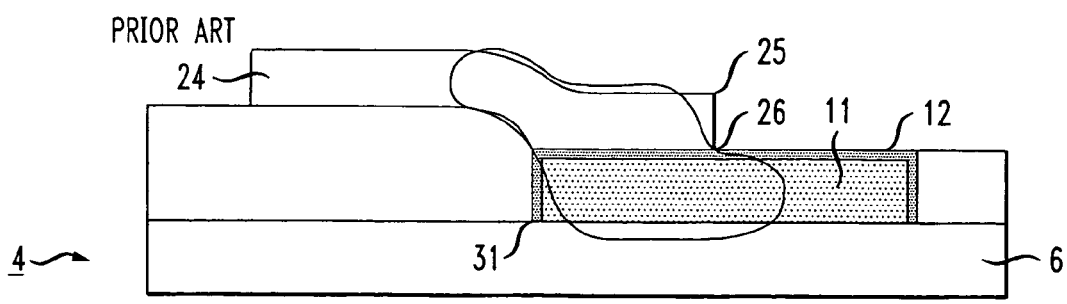

Another exemplary embodiment employing a silicon waveguiding element in association with an SOI wafer structure is illustrated in FIG. 4. In this example, a silicon "rib" structure similar to that of FIG. 3 is shown, including a single crystal silicon rib 11 and surrounding dielectric layer 12. In the arrangement of FIG. 4, a planar silicon waveguiding structure 20 is disposed above rib 11, and is supported in part by rib 11 and another surface layer 21 that has an effective refractive index less than that of the silicon waveguiding arrangement (for example, silicon dioxide or silicon nitride). Silicon waveguiding structure 20 includes a pair of edges, denoted 22 and 23, that are located in the vicinity of the supported optical signal within the waveguiding structure and will, therefore, introduce optical loss into the system. Additionally, edges 27 and 29 of single crystal silicon rib 11 will introduce loss into the waveguiding region. FIG. 5 is a variation/combination of the arrangements of FIGS. 3 and 4, where in this particular arrangement a silicon waveguiding structure 24 includes edges 25 and 26 (and single crystal silicon rib 11 includes an edge 31) that will impact optical signal loss within the waveguide, where the optical electric field contour is as shown in FIG. 5.

In accordance with the teachings of the present invention, the optical loss associated with the presence of corners/edges in silicon optical waveguiding structures is overcome by using CMOS processing steps to "round" the problematic edges and reduce the optical loss within the waveguide. It is to be understood that various forms of silicon may be utilized to form the waveguiding structures as discussed hereinbelow. These various forms of silicon include, but are not limited to, polysilicon, strained silicon, amorphous silicon, substantially single crystal silicon and single crystal silicon. The polysilicon itself may be further processed to form, for example, grain-size-enhanced polysilicon, grain-boundary-passivated polysilicon, or grain-aligned polysilicon. Moreover, the rounding technique of the present invention is considered to be equally applicable to active optical devices, such as disclosed in our copending application Ser. No. 10/795,748, where the silicon may include one or more dopants. It is be understood that for the fabrication of an active waveguide device, the electrical and optical properties of the silicon layer(s) is(are) also optimized using CMOS-compatible processes (as discussed in application Ser. No. 10/795,748), where appropriate integrated circuit fabrication techniques (as well as materials) are used to form electrical contacts to the waveguiding structure, taking into account the trade-off between electrical speed and optical loss.

For the purposes of discussion, the waveguiding silicon structure of the present invention will be discussed below as comprising "polysilicon". This definition should be considered as exemplary only, and for the sake of clarity, to distinguish this structure as a separate device element from the upper, single crystal silicon layer of an SOI wafer. Embodiments of the present invention that utilize a "sacrificial" silicon layer will also refer to this layer as "polysilicon", where it is to be understood that this layer may similarly comprise any of the suitable above-defined forms of silicon. Further, either or both of these "polysilicon" waveguiding layers may even comprise a multi-layer structure of one or more different forms of silicon. It is to be understood, however, that the various processing techniques as described in detail below are all compatible with these various forms of silicon and any of the processes may be used with the silicon waveguiding structure to form the desired rounded corner edges. Additionally, it is to be understood that this invention relates to the shape of the optical waveguide, and various process techniques associated with the optimization of the electrical and optical properties of the bulk materials comprising the waveguide layers are still considered integral aspects of the fabrication method. Indeed, these processes may be used in combination with the inventive waveguide rounding technique to optimize device performance by producing an optical waveguide device (active or passive) with low optical loss.

Figure 6:
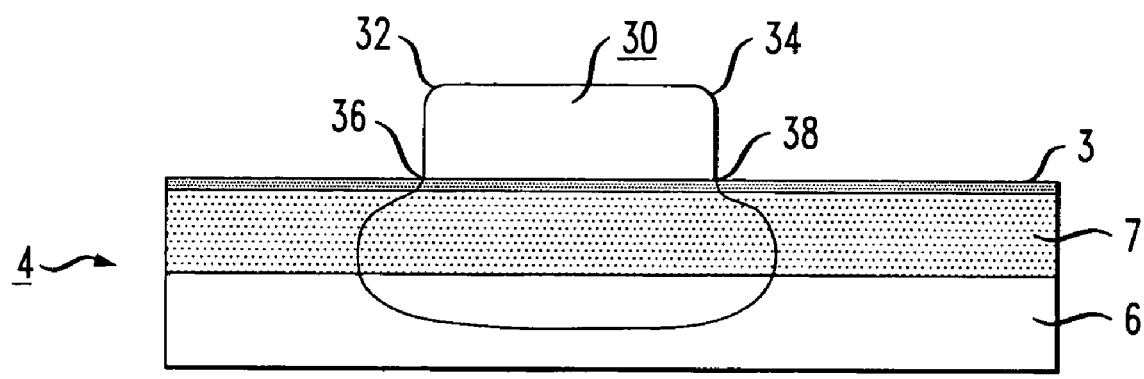
FIG. 6 illustrates a first embodiment of the present invention, with a silicon waveguiding layer exhibiting rounded top edges.

Referring to FIG. 6, a first embodiment of a rounded polysilicon waveguiding structure 30 formed in accordance with the present invention is shown, where upper edges 32 and 34 of waveguiding structure 30 have been rounded, as shown, to reduce loss. As compared to the embodiment of FIGS. 1 and 2, polysilicon waveguiding structure 30 is disposed over a relatively thin dielectric surface layer 3 formed on an SOI wafer including a relatively thin silicon surface layer 7 and buried dielectric layer 6 (silicon substrate 5 being omitted for the sake of clarity, particularly since substrate 5 does not affect the optical performance of any of the arrangements discussed hereinbelow if buried dielectric layer 6 is relatively thick). In this particular embodiment, bottom edges 36, 38, which contact dielectric layer 3, have not been modified and remain as "edges".

Figure 7:
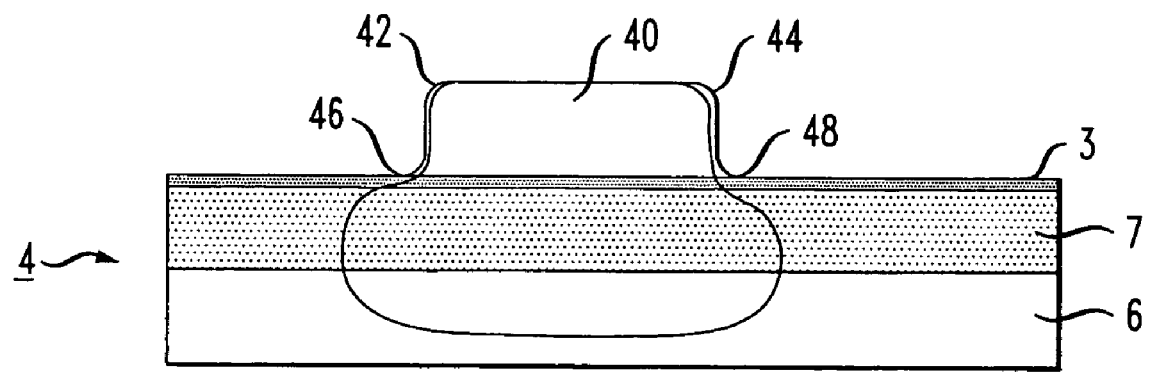
FIG. 7 illustrates a second embodiment of the present invention, with a silicon waveguiding layer exhibiting rounded top and bottom edges.
Figure 8:
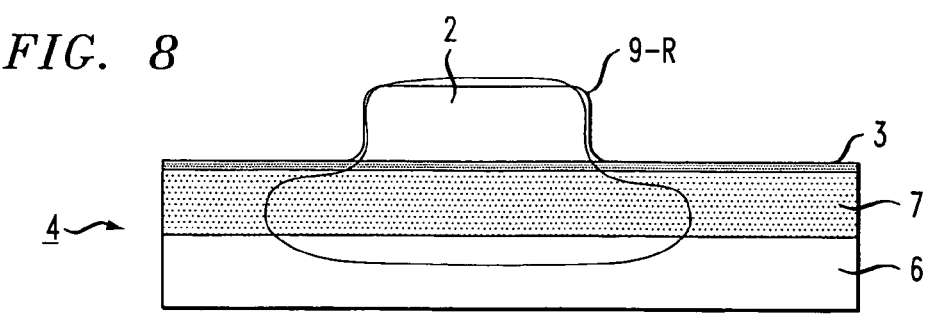
FIGS. 8-11 correspond to the geometries of FIGS. 2-5, the embodiments of FIGS. 8-11 exhibiting the use of rounded waveguide edges as formed in accordance with the present invention.
Figure 9:
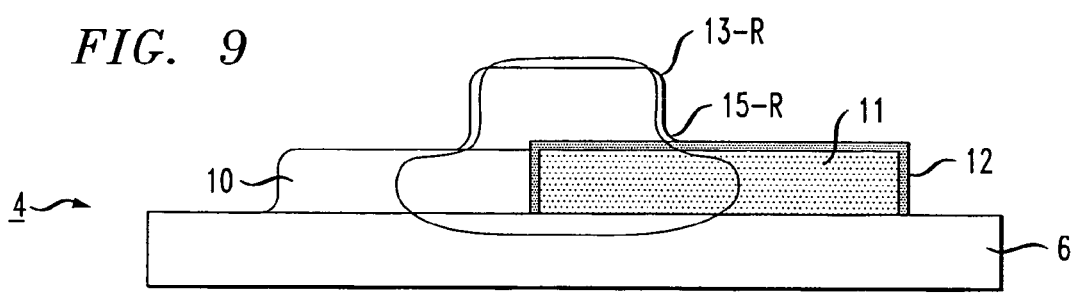
Figure 10:
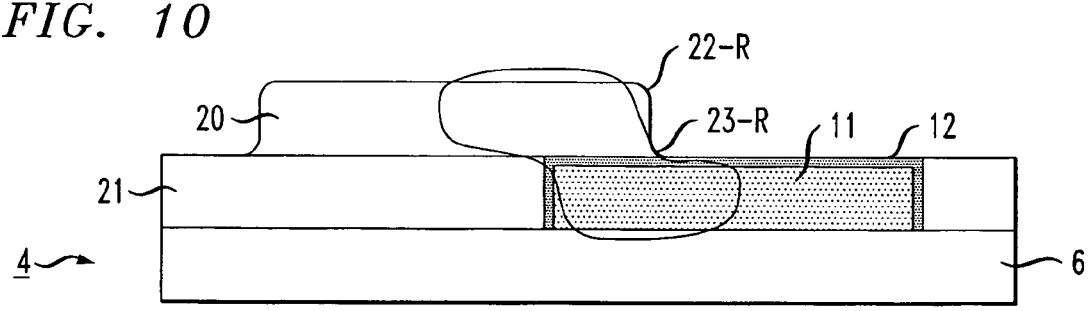
Figure 11:
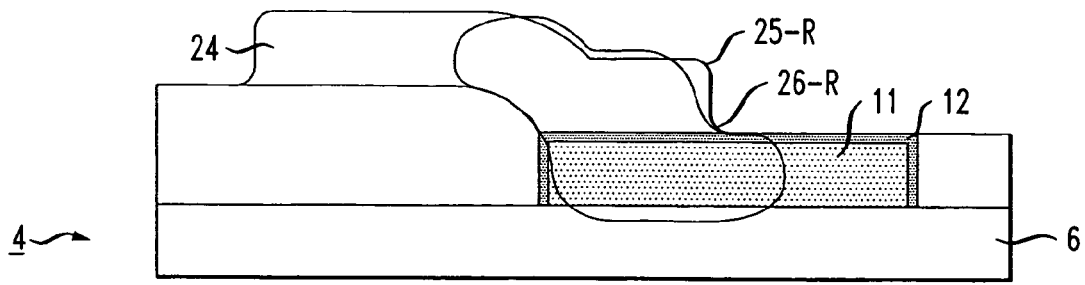

FIG. 7 illustrates an alternative embodiment of the present invention, including a polysilicon waveguiding structure 40 with a pair of rounded upper edges 42, 44 and a pair of rounded bottom edges 46, 48. By virtue of rounding all four edges associated with the rectangular configuration of waveguiding structure 40, optical signal loss will be significantly reduced, by reducing the optical field intensity at each corner. In essence, as the waveguide shape approaches a rounded shape, more of the propagating optical signal will remain guided along the length of the waveguide.

FIGS. 8-11 correspond in structure to the various waveguide geometries illustrated in FIGS. 2-5, where the straight-edged silicon waveguiding structures of these geometries has been replaced with a "rounded" silicon waveguiding structure formed in accordance with the present invention. As shown, silicon waveguiding structure 2 of FIG. 8 now includes rounded top edges 9-R. Similarly, silicon waveguiding structure 10 of FIG. 9 includes a rounded top edge 13-R and a rounded bottom edge 15-R. Silicon waveguiding structure 20 of FIG. 10 has been processed in accordance with the present invention, and as will be explained in detail below, to include a rounded top edge 22-R and a rounded bottom edge 23-R. Silicon waveguiding structure 24 of FIG. 11 has been processed, in accordance with the present invention, to include a rounded top edge 25-R and a rounded bottom edge 26-R. Each of these structures as well as various other structures discussed hereinbelow, will exhibit improved optical performance, by virtue of the rounded waveguide design.

As will be discussed below, various CMOS processing steps may be employed to form the rounded polysilicon waveguiding structure in accordance with the present invention. In most cases, a sacrificial polysilicon (or amorphous silicon) layer is deposited on the waveguiding structure, with one or more additional processing steps then performed to introduce rounded edges in the underlying waveguiding polysilicon structure. As discussed above, this sacrificial layer may be further processed to form any of the various forms of silicon discussed above, and/or may be further processed to create appropriate doping profiles (as may be required for the formation of active devices). Alternatively, a plasma-based silicon etch process in combination with a dielectric etch stop layer (for endpoint detection of the process), or a thermal oxidation process, may be used to round the silicon optical waveguiding structure.

Figure 12:
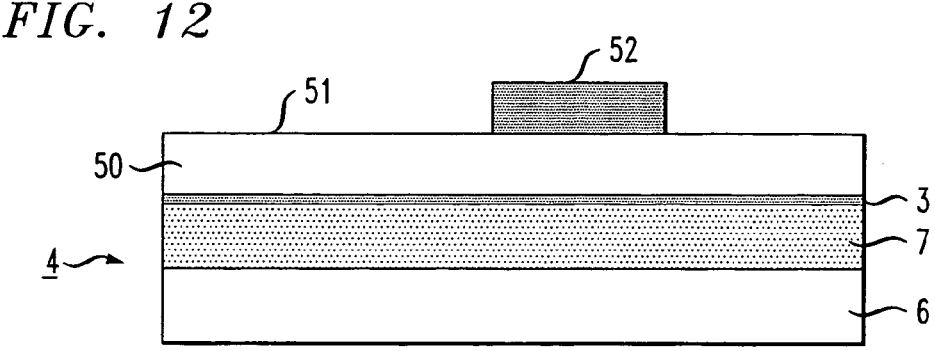
FIGS. 12-15 illustrate a first exemplary set of process steps used to form rounded top edges in a silicon waveguiding structure, the process utilizing a sacrificial silicon layer.
Figure 13:
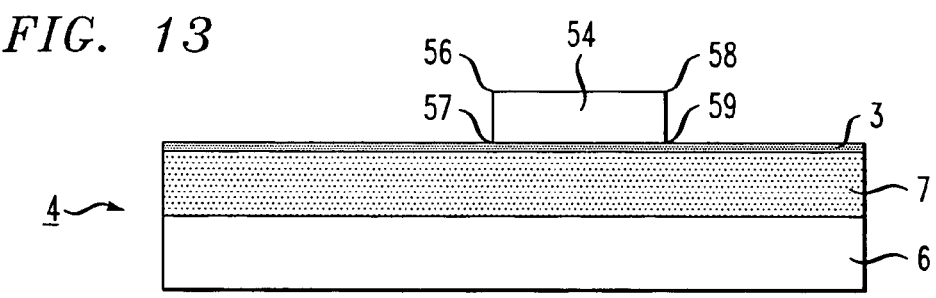

FIGS. 12-15 illustrate one exemplary process of the present invention that may be utilized to form rounded "top" edges in a silicon waveguiding structure, these steps used to form a structure such as waveguiding structure 30 of FIG. 7. Referring to FIG. 12, the SOI wafer 4 including buried dielectric layer 6 and silicon surface layer 7 is first processed to include a relatively thin dielectric layer 3. In one embodiment, a conventional thermal process may be used to convert a top surface portion of single crystal silicon layer 7 into silicon dioxide. Alternatively, another dielectric material, such as silicon nitride, silicon oxynitride, bismuth oxide, hafnium oxide, etc. may be deposited or otherwise formed on silicon layer 7 to form relatively thin dielectric layer 3. Subsequent to the formation of dielectric layer 3, a polysilicon layer 50 is blanket deposited to cover the surface of dielectric layer 3. A patterned photoresist 52 is then formed over surface 51 of polysilicon layer 50, where photoresist 52 is used to define the location of the final waveguiding structure. With patterned photoresist 52 in place, the exposed portions of polysilicon layer 50 are removed by a conventional etching process so as to expose the underlying dielectric layer 3, as shown in FIG. 13. The remainder of photoresist 52 is then removed. The portion of polysilicon layer 50 remaining in the step shown in FIG. 13 may be defined as a polysilicon waveguiding structure 54, including top edges 56, 58 and bottom edges 57, 59, where the presence of these edges introduces optical signal loss, as discussed above.

Figure 14:
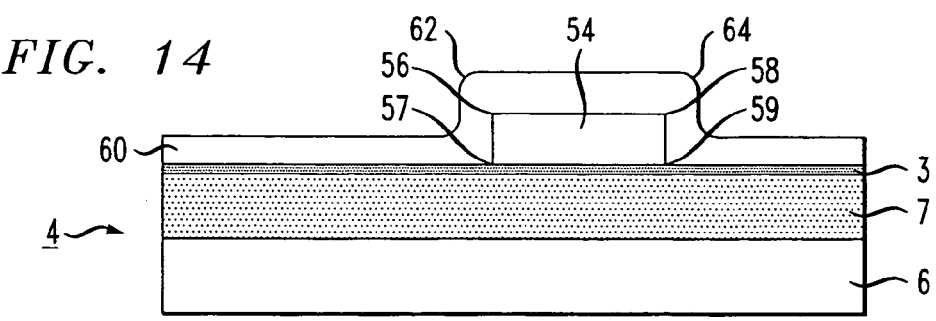
Figure 15:
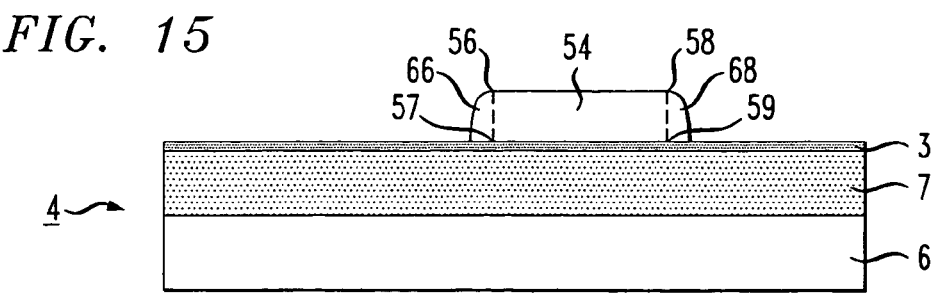

In accordance with the teaching of the present invention, a sacrificial polysilicon layer 60 is then deposited to completely cover the polysilicon waveguiding structure and the exposed sections of dielectric layer 3. As is well known in the art, and mentioned above, polysilicon (or amorphous silicon) will conformally coat underlying features as it is deposited. Advantageously, this conformal coating results in forming rounded corners 62 and 64 as part of polysilicon layer 60, as shown in FIG. 14. In order to form rounded top edges in the underlying polysilicon waveguiding structure 54, therefore, the rounded features in sacrificial polysilicon layer 60 are transferred into structure 54. In the particular process step of the present invention as illustrated in FIG. 15, this transfer is accomplished by etching sacrificial polysilicon layer 60, where dielectric layer 3 will function as an etch stop. Any appropriate etching technique may be used to form the desired structure, such as (for example), plasma etching or reactive ion etching (RIE). A plasma-based etching technique, being a relatively low temperature process, is particularly well-suited for use with active devices, since dopant migration will be minimized. The plasma etching process may use any suitable species, including but not limited to hydrogen, fluorine, chlorine, bromine or iodine, where it is known that some species are more isotropic than others and typically a combination of plasma chemistry, process parameters (e.g., power, pressure, flow rate) and equipment design is selected to obtain the desired etch profile (in this case, a rounded sidewall). Indeed, the etching process results in the formation of "sidewall" fillets 66 and 68, disposed on either side of polysilicon waveguiding structure 54. In accordance with the present invention, therefore, these polysilicon fillets will become part of the optical waveguiding structure and eliminate any loss associated with edges 56, 58, since these edges are essentially eliminated by the presence of fillets 66, 68. Moreover, the etching technique may serve to smooth the exposed surfaces of fillets 66 and 68, thereby reducing optical scattering loss along the sidewalls of waveguiding structure 54. Alternatively, a hydrogen annealing process may be used to smooth the sidewalls and other surfaces of the structure.

Figure 16:
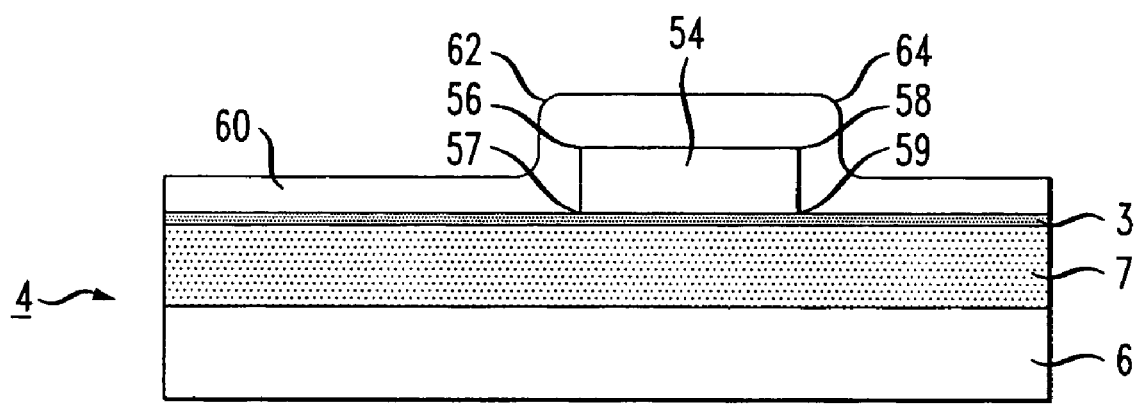
FIGS. 16 and 17 illustrate an alternative, thermal oxidation process including a sacrificial silicon layer that may be used to form rounded corner edges.
Figure 17:
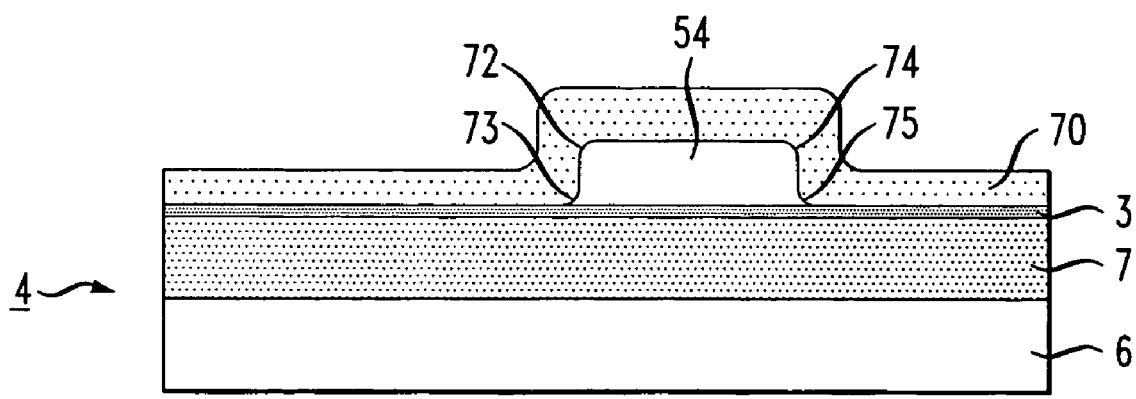

As an alternative to the etching process, the transfer of the rounded corners of sacrificial polysilicon layer 60 may be provided by exposing the structure of FIG. 16 to a conventional thermal treatment to oxidize polysilicon layer 60. As will be shown below, the use of a thermal process results in rounding both top edges 56, 58 and bottom edges 57, 59. FIG. 16, which is identical to FIG. 14, illustrates the structure prior to the oxidation process. As shown and discussed above, polysilicon layer 60 is formed to conformally coat underlying polysilicon waveguiding structure 54. In this case, the structure of FIG. 16 is subjected to a conventional thermal oxidation process (exemplary temperature of about 800° C. in a wet oxidation process). The thermal process will oxidize polysilicon layer 60, changing at least a portion of this layer into an oxide layer 70, thus consuming a portion of polysilicon layer 60 and thus affecting the structure of underlying polysilicon waveguiding structure 54 to round top edges 56, 58 and bottom edges 57, 59, forming rounded top edges 72, 74 and rounded bottom edges 73, 75, respectively, as shown in FIG. 17.

Figure 18:
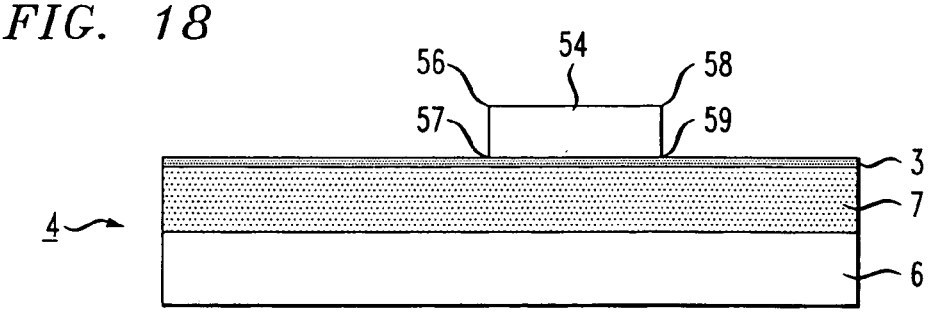
FIGS. 18-21 illustrate another set of processing steps where an "etch stop" layer is disposed between the silicon waveguide structure and the sacrificial silicon layer.
Figure 19:
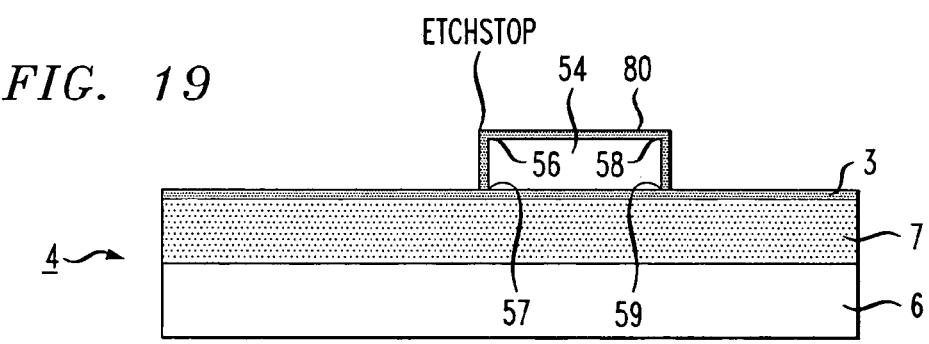

FIGS. 18-21 illustrate an alternative method of forming a rounded-edge silicon waveguide in accordance with the present invention, where this process utilizes a dielectric layer as an "etch stop" for the process of forming polysilicon sidewalls along the waveguiding structure. FIG. 18 is essentially identical to FIG. 13, illustrating the step in the process where a rectangular polysilicon waveguiding structure 54, including edges 56 and 58, is formed along a surface portion of relatively thin dielectric layer 3. Subsequent to this step, a thin dielectric layer 80 is formed to cover the surface portion of polysilicon waveguiding structure 54. For example, a thermal oxidation process may be used to convert a surface portion of polysilicon waveguiding structure 54 into a silicon dioxide layer 80, as shown in FIG. 19. In accordance with this particular embodiment of the present invention, silicon dioxide layer 80 is used as an "etch stop" for the following process steps. Alternatively, other dielectric materials, such as silicon nitride, silicon oxynitride, bismuth oxide, hafnium oxide, etc, may be deposited or otherwise formed to provide for relatively thin dielectric layer 80.

Figure 20:
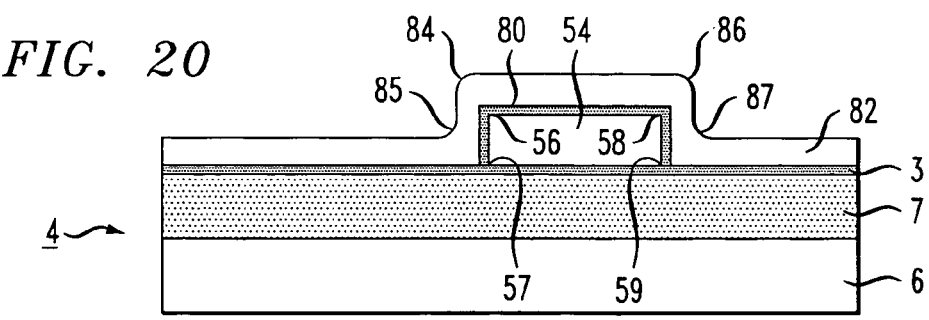
Figure 21:
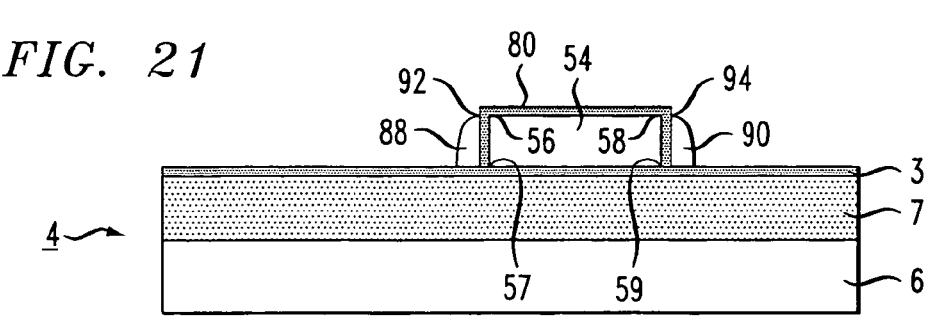

FIG. 20 illustrates the next step in the process, the deposition of a sacrificial polysilicon layer 82. As shown, polysilicon layer 82 is disposed to cover the exposed portion of dielectric layer 3, as well as dielectric 80. Since polysilicon layer 82 conformally coats the structure, rounded corners 84, 85, 86 and 87 are formed and can be utilized to transfer this characteristic into the body of polysilicon layer 82. Subsequent to the deposition of polysilicon layer 82, an anisotropic etch may be used to remove most of the polysilicon, leaving a pair of sidewalls 88 and 90, as shown in FIG. 21, exhibiting rounded top edges 92 and 94, respectively. Since dielectric layers 3 and 80 both function as an etch stop, end-point detection of the etch process is relatively easy to ascertain and control. The use of an anisotropic etch process not only serves to "round" the upper corners of waveguiding structure 54, but also smooth the sidewalls of waveguiding structure 54 and thereby reduces optical scattering loss along the sidewalls of the waveguide structure.

Figure 22:
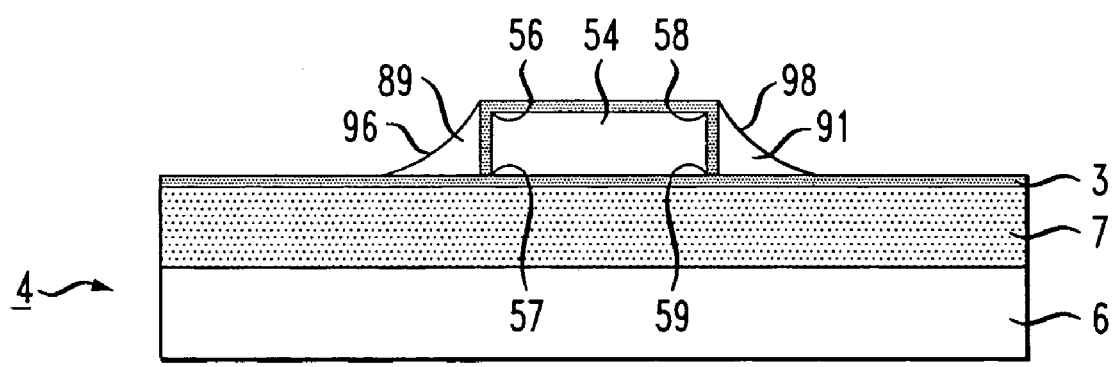
FIG. 22 illustrates an exemplary "rounded" structure of the present invention, formed by using an isotropic etch process.
Figure 23:
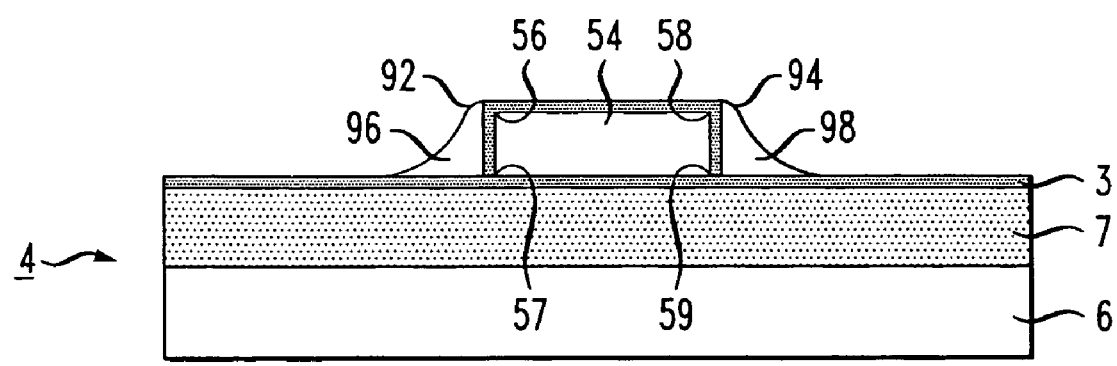
FIG. 23 illustrates an exemplary "rounded" structure of the present invention, formed by using an anisotropic etch process.

An isotropic etch process, in contrast, may be used to etch the structure of FIG. 20, forming sidewall fillets 89 and 91 that exhibit rounded bottom edges 96 and 98, as shown in FIG. 22. The use of an isotropic etch process may be preferred in those situations where the presence of high intensity optical fields at bottom corners 57, 59 of waveguiding structure 54 is more problematic. Alternatively, a combination of anisotropic and isotropic etching may be used, in a controlled manner (preferably, as part of an in situ process) to form both top rounded edges 92, 94 and bottom rounded edges 96, 98, as shown in FIG. 23. In this case, the chemistry of the etching processes, etch rate, and various other parameters need to be well-controlled and monitored so as to transition between the anisotropic and isotropic processes in a manner that forms the desired rounded profile.

Some of the structures within an integrated electro-optic circuit may require "right-angled" corners in a waveguiding structure (such as waveguiding structure 54) and will not perform optimally if these corners are rounded. The ability to maintain these sharp edges can be achieved by masking the areas where corner rounding is desired (subsequent to processing), and then selectively removing the sidewall fillets from the remaining areas using conventional etching techniques (such as, for example, plasma etching).

Figure 24:
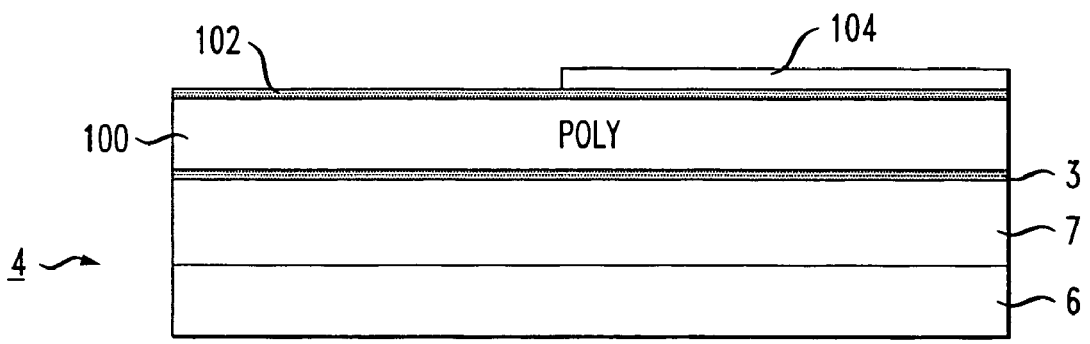
FIGS. 24-26 illustrate an alternative set of process steps that may be used to form a rounded silicon waveguide structure, in this case by oxidizing a portion of the exposed silicon layer to form a rounded bird's beak along the waveguide edge.

An alternative process, which has also been found to round both top and bottom edges, is illustrated in FIGS. 24-29. Referring to FIG. 24, the process begins by depositing a blanket layer of polysilicon 100 over dielectric 3 formed on SOI wafer 4. Once polysilicon layer 100 has been deposited, a short thermal oxidation process is used to oxidize a relatively thin top layer of polysilicon 100 to form silicon dioxide layer 102. The next step in the process, as shown in FIG. 24, is the formation of an oxidation-resistant layer 104 over the surface of oxide layer 102, where silicon nitride may be used for this layer. As shown in FIG. 24, oxidation-resistant layer 104 is patterned (by using a photoresist, for example) to protect the area(s) within which the polysilicon waveguiding structure is to be formed.

Figure 25:
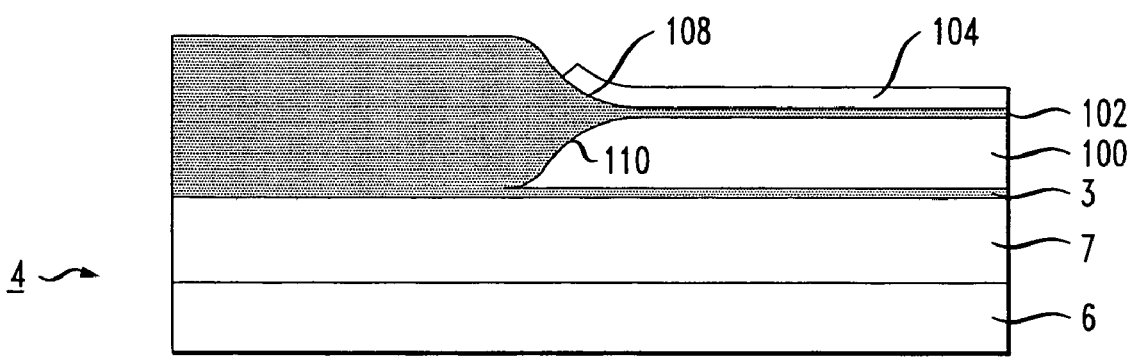
Figure 26:
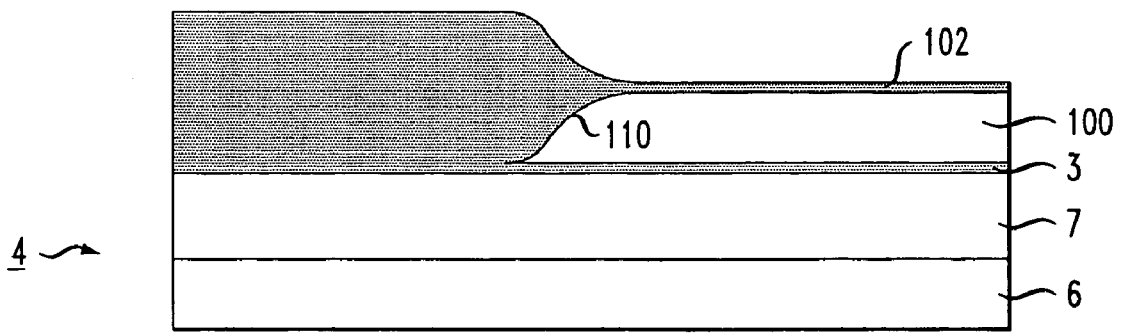

With the patterning of oxidation-resistant layer 104, a thermal process can then be used to transform the polysilicon in the exposed area into silicon dioxide, as shown in FIG. 25. As shown, the thermal oxidation process will result in the formation of a "bird's beak" 108 underneath an edge portion of oxidation-resistant layer 104, causing layer 104 to lift slightly. Similar to the embodiment discussed above in association with FIGS. 16 and 17, a thermal oxidation process will result in "rounding" the waveguide edges in the affected polysilicon area. In this example, the thermal process results in forming a rounded edge 110 within polysilicon layer 100, in conjunction with the formation of bird's beak 108. Once the desired thickness of polysilicon 100 has been oxidized, the remaining portion of oxidation-resistant layer 104 is removed, resulting in the structure as illustrated in FIG. 26.

Figure 27:
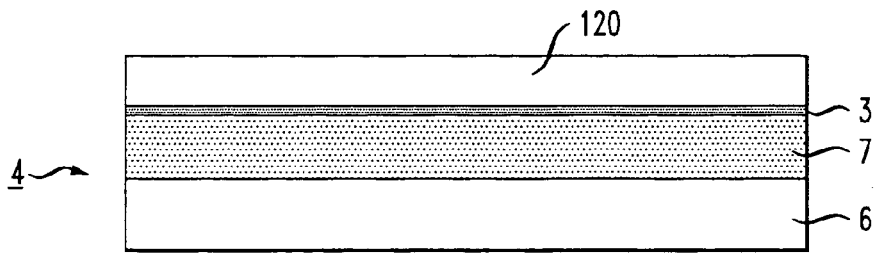
FIGS. 27-31 illustrate a set of steps of the inventive process, used to form rounded edges in an upper silicon surface layer, as well as an overlying silicon layer, of an SOI structure.
Figure 28:
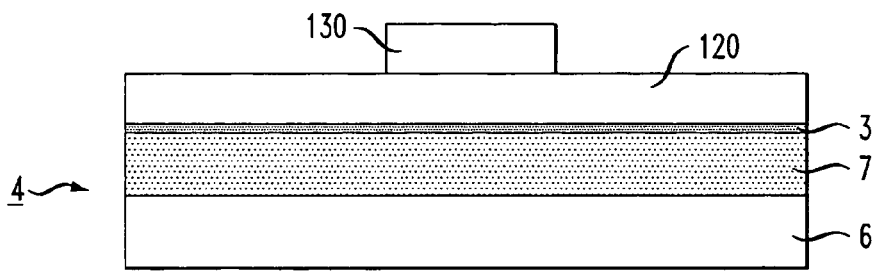

Not only is the rounding technique of the present invention applicable to a "polysilicon" layer formed over an SOI structure, but it may also be used to round edges of a single crystal silicon waveguide structure formed from the material of surface silicon layer 7 of SOI structure 4. For example, conventional plasma-based isotropic and anisotropic etch processes may be used to shape and round the edges of the single crystal silicon material in the waveguiding region, as discussed above. An alternative processing sequence is contained in FIGS. 27-30, which illustrate a set of exemplary processing steps that may be used to "round" the edges of an exemplary single crystal silicon waveguide 11 formed from single crystal silicon surface layer 7, where the structure as illustrated in FIG. 27 also includes a relatively thin dielectric layer 3, as illustrated above. Referring to FIG. 27, the process begins by depositing a blanket layer 120 of an oxidation-resistant material (such as silicon nitride) over relatively thin dielectric layer 3. A photoresist layer 130 is subsequently deposited over oxidation-resistant layer 120 and patterned so as to protect the areas that are to form the optical waveguiding structures, as shown in FIG. 28.

Figure 29:
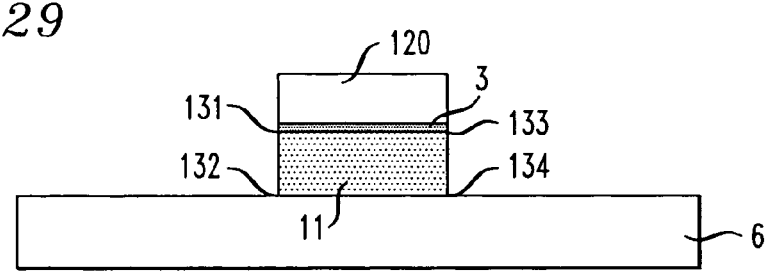
Figure 30:
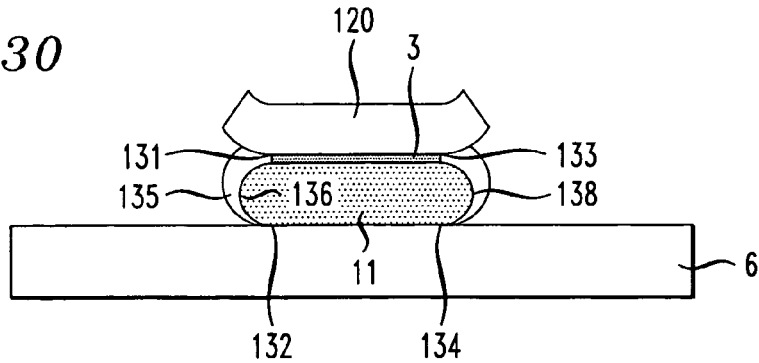

The exposed regions of layer 120, dielectric layer 3 and single crystal silicon surface layer 7 are then removed using a suitable etchant(s), leaving the structure as shown in FIG. 29. The waveguiding structure 11 thus formed from silicon surface layer 7 (of FIG. 28) now exhibits edges 131, 132, 133 and 134 which will result in introducing optical loss for a signal propagating along waveguiding structure 11, for the reasons discussed above. Therefore, in accordance with the present invention, a thermal oxidation process may be used that will consume a portion of the exposed surface of single crystal silicon 11, forming a layer of silicon dioxide 135, as shown in FIG. 30. As discussed above, the thermal oxidation process functions to round corners 131-134 of single crystal silicon waveguiding structure 11, while also smoothing sidewalls 136 and 138 of waveguiding structure 11, the sidewall smoothing associated with reducing optical scattering loss.

Figure 31:
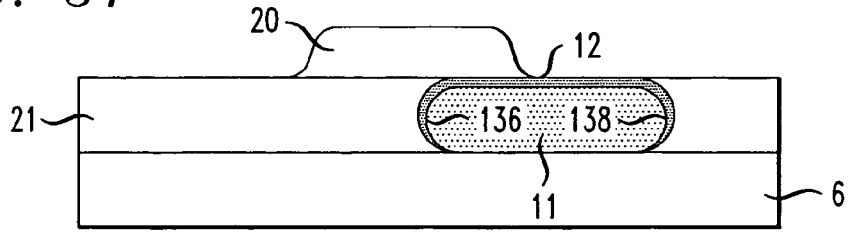

Advantageously, the process of the present invention may then be repeated for subsequent optical waveguiding layers deposited over single crystal silicon waveguiding structure 11. In particular, the remaining portion of oxidation-resistant layer 120 may be removed, and subsequent layers deposited and similarly processed to form rounded corners. FIG. 31 illustrates, for example, an embodiment of the present invention similar to that illustrated in FIG. 10, including a surface layer 21 (of a relatively low refractive index material) and a silicon waveguiding region 20. A suitable rounding process of the present invention, as described above, can be used to round the edges of waveguide 20. Therefore, by using the rounding process on both silicon layers forming the optical waveguiding structure, optical losses associated with these sources of high intensity optical fields will be minimized.

Figure 32:
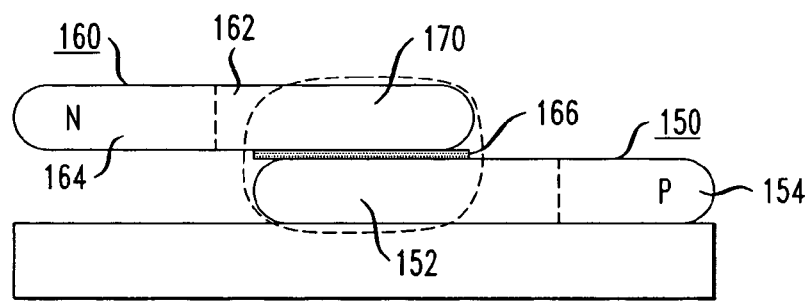
FIGS. 32-34 illustrate active optical waveguiding structures utilizing rounded edges formed in accordance with the present invention.
Figure 33:
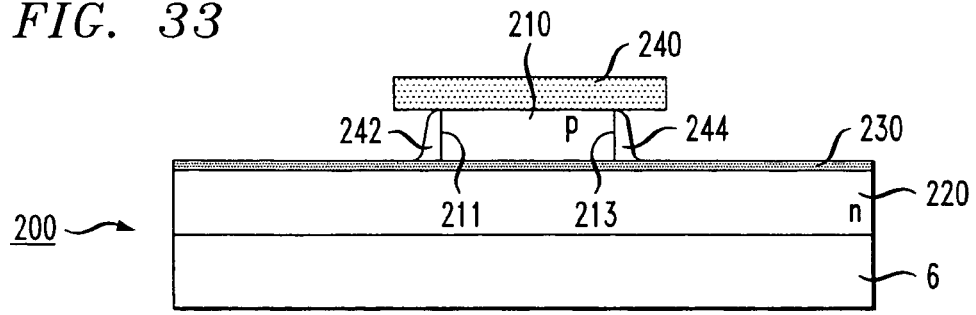
Figure 34:
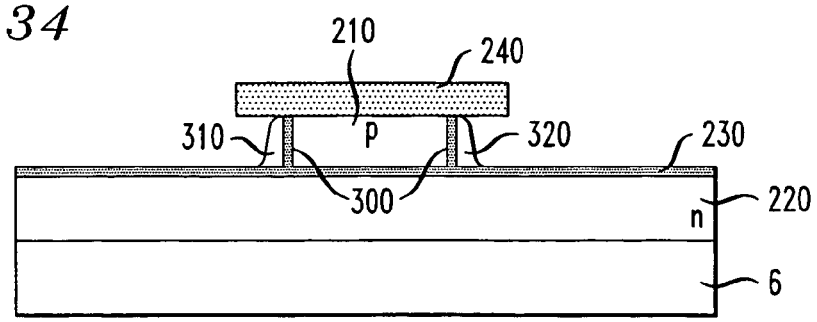

As mentioned above, the rounding process of the present invention is equally applicable to preventing optical loss in active devices. FIGS. 32-34 illustrate, in simplified form, various types of active devices that will benefit from such processing. FIG. 32 illustrates a first type of electro-optic modulator, formed on an SOI platform, where a single crystal silicon surface layer 150 has been processed to form a waveguiding structure and doped to have a desired doping profile suitable to both support optical propagation in a first region 152 and provide an electrical contact area in a second region 154. A silicon waveguiding layer 160 of opposite conductivity type is subsequently formed over layer 150, where layer 160 also includes a first region 162 for supporting optical propagation and a second region 164 for providing an electrical contact. Layer 160 is disposed so as to overlap layer 150 in a manner whereby first region 152 of layer 150 is disposed underneath first region 162 of layer 160, with a relatively thin dielectric layer 166 disposed therebetween. The overlapped regions will thus form an optical waveguiding structure 170. By utilizing the rounding technique of the present invention, therefore, optical losses within waveguiding structure 170 are significantly reduced.

An alternative active device structure 200 is illustrated in FIG. 33, which utilizes a polysilicon waveguiding rib 210 of a first conductivity type disposed over a single crystal silicon surface layer 220 of a second conductivity type. A relatively thin dielectric layer 230 is disposed between waveguiding rib 210 and surface layer 220, where this combination then forms the optical guiding region of the active device. A contact layer 240 is used to provide the electrical signal input to layer 220. In accordance with the present invention, various ones of the rounding techniques may be applied to polysilicon waveguiding rib 210 to reduce optical signal loss within the modulating device. In this particular configuration of FIG. 33, a pair of polysilicon sidewall fillets 242, 244 are illustrated as having been formed along each sidewall 211, 213 (respectively) of waveguiding rib 210, using one of the processes discussed above. FIG. 34 illustrates a variation of the embodiment of FIG. 33, where a relatively thin dielectric layer 300 is used as an etch stop/endpoint detection layer in the sidewall fillet formation process. Referring to FIG. 34, a pair of sidewall fillets 310, 320 are illustrated as formed on either side of waveguiding structure 210, and separated therefrom by relatively thin dielectric layer 300. It is to be understood that prior to the formation of contact layer 240, the top surface portion of relatively thin dielectric layer 300 needs to be removed to form an electrical contact path.

It is to be understood that the various process sequences illustrated and discussed above are exemplary only, and there exist many variations on the process sequences, etchant materials, silicon forms, etc. that may be used to form the rounded waveguide edges in accordance with the present invention. Indeed, the present invention is intended to be limited in spirit only by the scope of the claims as appended hereto.

What is claimed is:

1. A low loss optical waveguiding structure disposed on a top surface of a silicon-on-insulator (SOI) wafer comprising a silicon substrate, a buried dielectric layer and a relatively thin silicon surface waveguiding layer disposed over the buried dielectric layer, the low loss optical waveguiding structure comprising a relatively thin dielectric layer disposed over at least a portion of the relatively thin silicon surface waveguiding layer; and a silicon waveguiding structure disposed over at least a portion of the relatively thin dielectric layer, the combination of the contiguous portions of the relatively thin silicon surface waveguiding layer, the relatively thin dielectric layer and the silicon waveguiding structure forming an optical waveguiding region, wherein both the relatively thin silicon surface waveguiding layer and the silicon waveguiding structure are defined as exhibiting at least one rounded edge in the waveguiding region to reduce optical loss in the optical waveguiding structure.

2. A low loss optical waveguiding structure as defined in claim 1 wherein the at least one rounded edge comprises a sidewall silicon fillet disposed contiguous with the silicon waveguiding structure.

3. A low loss optical waveguiding structure as defined in claim 1 wherein the structure further comprises a relatively thin etch stop layer disposed over the relatively thin silicon surface waveguiding layer.

4. A low loss optical waveguiding structure as defined in claim 1 wherein the waveguiding structure is a passive device.

5. A low loss optical waveguidmg structure as defined in claim 1 wherein the waveguiding structure is an active device, with the relatively thin silicon surface waveguiding layer exhibiting a first conductivity type and the silicon waveguiding structure exhibiting a second conductivity type.

* * * * *